(12) United States Patent
Chen et al.

(10) Patent No.: US 7,452,117 B2
(45) Date of Patent: Nov. 18, 2008

(54) NOISE REDUCTION DEVICE FOR USE IN A BACKLIGHT MODULE

(75) Inventors: Shin-Li Chen, Yunlin County (TW);
Fei-Ling Chou, Hsinchu County (TW)

(73) Assignee: Au Optronics Corp., Hsinchu (TW)

( * ) Notice: Subject to any disclaimer, the term of this patent is extended or adjusted under 35 U.S.C. 154(b) by 77 days.

(21) Appl. No.: 11/398,288

(22) Filed: Apr. 5, 2006

(65) Prior Publication Data
US 2007/0127226 A1  Jun. 7, 2007

(30) Foreign Application Priority Data
Dec. 2, 2005  (TW) .............................. 94142653 A

(51) Int. Cl.
*F21V 17/27* (2006.01)
(52) U.S. Cl. ..................... 362/581; 362/26; 362/27; 362/600; 362/613; 362/632
(58) Field of Classification Search ................. 362/581, 362/26, 27, 600, 613, 614, 632–634, 218, 362/225, 559, 561; 349/61–65
See application file for complete search history.

(56) References Cited

U.S. PATENT DOCUMENTS

| 6,880,953 B2 * | 4/2005 | Shin ........................... 362/225 |
| 2005/0057946 A1 | 3/2005 | Kim |
| 2005/0088809 A1 | 4/2005 | Nakagawa et al. |

FOREIGN PATENT DOCUMENTS

| CN | 1595257 A | 3/2005 |
| CN | 1601338 A | 3/2005 |

* cited by examiner

*Primary Examiner*—Sandra O'Shea
*Assistant Examiner*—Mark Tsidulko
(74) *Attorney, Agent, or Firm*—Patterson, Thuente, Skaar & Christensen, P.A.

(57) ABSTRACT

A noise reduction device for use in a backlight module includes a plurality of noise reduction devices, each comprising a main body and an extension portion. The extension portion is adapted to cushion the interface between a lamp holder and a back bezel of the backlight module, so as to reduce pop noises generated by contact during temperature changes.

11 Claims, 6 Drawing Sheets

NOISE REDUCTION DEVICE FOR USE IN A BACKLIGHT MODULE

CROSS-REFERENCES TO RELATED APPLICATIONS

This application claims the priority of Taiwan Patent Application No. 094142653, filed on Dec. 2, 2005.

BACKGROUND OF THE INVENTION

1. Field of the Invention

The present invention relates to a noise reduction device, more specifically, a noise reduction device for use in a backlight module of a liquid crystal display (LCD).

2. Descriptions of the Related Art

Due to the advantages of slimness, power-saving and low radiation, liquid crystal displays (LCDs) have been widely applied in consumer electronic products. A direct-type backlight module is frequently employed in the illumination technology of an LCD. The main structure of the LCD generally comprises two portions, namely, a panel module and a backlight module. The panel module primarily includes an indium-tin-oxide (ITO) conductive glass substrate, liquid crystal layer, alignment film, color filter, polarizer sheet, and driving integrated circuits (IC). The backlight module mainly includes a light source, a light guide plate, a brightness enhancement film (BEF), a diffusion sheet, a reflection sheet, and an optics-film. Because the panel module is not luminous, it needs the backlight module to furnish visible lights to make the display operate under a normal condition.

In the direct-type backlight module, a cold cathode fluorescent lamp (CCFL), an external electrode fluorescent lamp (EEFL), or a light emitted diode (LED), can be selected as the light source. As an example, FIG. 1 illustrates a conventional cold cathode fluorescent lamp (CCFL) for use in a back light module. The backlight module includes a back bezel 10, two lamp holders 20, a reflector sheet 30, and a plurality of CCFLs. 40. The back bezel 10 comprises a rectangle back plate and four side plates disposed around the rectangle back plate to constitute a frame structure and to form a receiving space (often referred to as the light box) within the frame structure. Moreover, the two lamp holders 20 are independently fixed onto two opposing side plates of the back bezel 10. The reflector sheet 30 is disposed above the back plate of the back bezel 10. The plurality of lamps 40 are disposed in the light box of the back bezel, with both ends of each lamp 40 fastened by the two lamp holders 20 so that the lamps 40 can be fixed above the reflector sheet 30 for projecting lights to an optical component (not shown) of the backlight module.

With reference to FIG. 2, a partially enlarged view of the upper-left area of the subject in FIG. 1, the back bezel 10, lamp holders 20, reflector sheet 30, lamps 40 and their interrelated positions are clearly shown. In consideration of cost, dimension and insulation effects, plastic material is always used for making the lamp holder 20 of the backlight module; however, the plastic material varies in dimension depending on the temperature change, especially in response to the operation or non-operation of the light-box. The back bezel 10 which is often made of metal material, such as aluminum (Al), iron (Fe), or the like also bears similar variation tendencies due to temperature changes. This phenomenon causes the lamp holders and the back bezel to change dimensions themselves, affecting the dimensions of the gap formed between these two structures. In the worst case scenario, these two structures would come into contact with each other intermittently to cause a well known "pop noise".

FIG. 3 shows a conventional fastening technology of lamps and lamp holders. In this figure, a plurality of fastening elements 50 are engaged onto the lamp holders 20 (also shown in FIG. 2). Each of the fastening elements 50 comprises a recess for receiving the end of each of the lamps. By means of engaging each fastening element 50 to the lamp holder 20, the lamps 40 could easily engage onto the lamp holders 20. It is understandable that FIG. 3 only shows the schematic view of one side of the backlight module. In an actual embodiment, the quantity of the fastening elements 50 would correspond to that of the lamps 40.

Conventional technology resolves the above-mentioned pop noise using two major measures. One is that the originally designed gap between the back bezel 10 and the lamp holders 20 can be increased to a size greater than the existing deformation generated by the back bezel 10 and the lamp holders 20 under possible thermal expansion and cold contraction. In this case, the back bezel 10 would not come into contact with the lamp holders 20, and therefore the concerned pop noise can be avoided. However, there are still other unexpected problems. Specifically, the increasing gap allows undesired dust to leak through. In other words, although increasing the gap between the back bezel 10 and the lamp holders 20 can solve the pop noise problem due to temperature change, the gap can worsen the dust leakage problem. This dust leakage problem is of great concern, which is a quite concern in the LCD design field. The other measure taken to avoid the pop noise is to apply a sticker stripe that has a double-faced adhesive between the back bezel 10 and the lamp holders 20. Although this arrangement can somewhat make up for the aforementioned dust leakage problem, it makes the assembly process more complicated and is not cost and time effective.

Given the above, it is critical to create an inventive design in a backlight module that is capable of resolving the pop noise that generates between the lamp holders and the back bezel due to operational temperature changes. In addition, this design could avoid undesired dust leakage between the holders and back bezel, while providing a simple manufacturing and assembly process.

SUMMARY OF THE INVENTION

An objective of the present invention is to provide a noise reduction device for use in a backlight module. By means of disposing the device between the lamp holders and the back bezel of the backlight module, the pop noise generated therebetween by contact under the operational temperature changes can be reduced or eliminated.

Another objective of the present invention is to provide a noise reduction device for use in a backlight module. By means of integrally forming the device between the lamps holders and the back bezel of the backlight module, the uniform pitch between each two adjacent lamps can be well controlled, thereby facilitating the assembly procedures and promoting product quality.

A further objective of the present invention is to provide a noise reduction device for use in a backlight module, such that the noise reduction device disposed between the lamp holders and the back bezel of the backlight module is able to block the dust from going through.

According to the above-mentioned objectives, the noise reduction device for use in a backlight module is disposed between the lamp holder and the back bezel for providing an auxiliary support for the lamp holder to fix onto one of the lamps. The noise reduction device comprises a plurality of noise reduction members, each having a main body and an extension portion, wherein the main body further comprises a formed recess for the fixture of the lamp to the backlight module. The extension portion extends outward from the main body, such that the extension portion can serve as a cushion between the lamp holder and the back bezel, substantially thermally isolating the lamp holder from the back bezel so as to reduce the pop or burst noise due to temperature changes, especially when the LCD is turned on or off. This arrangement effectively prevents dust leakage, making it possible to predetermine the equal pitch between the two adjacent lamps, simplifying the manufacturing process and making the assembly process easy to control.

Other aspects, features, and advantages of the present invention become apparent from analyzing the following detailed descriptions and accompanying drawings of the preferred embodiments.

DESCRIPTION OF THE PREFERRED EMBODIMENT

Figure 1:
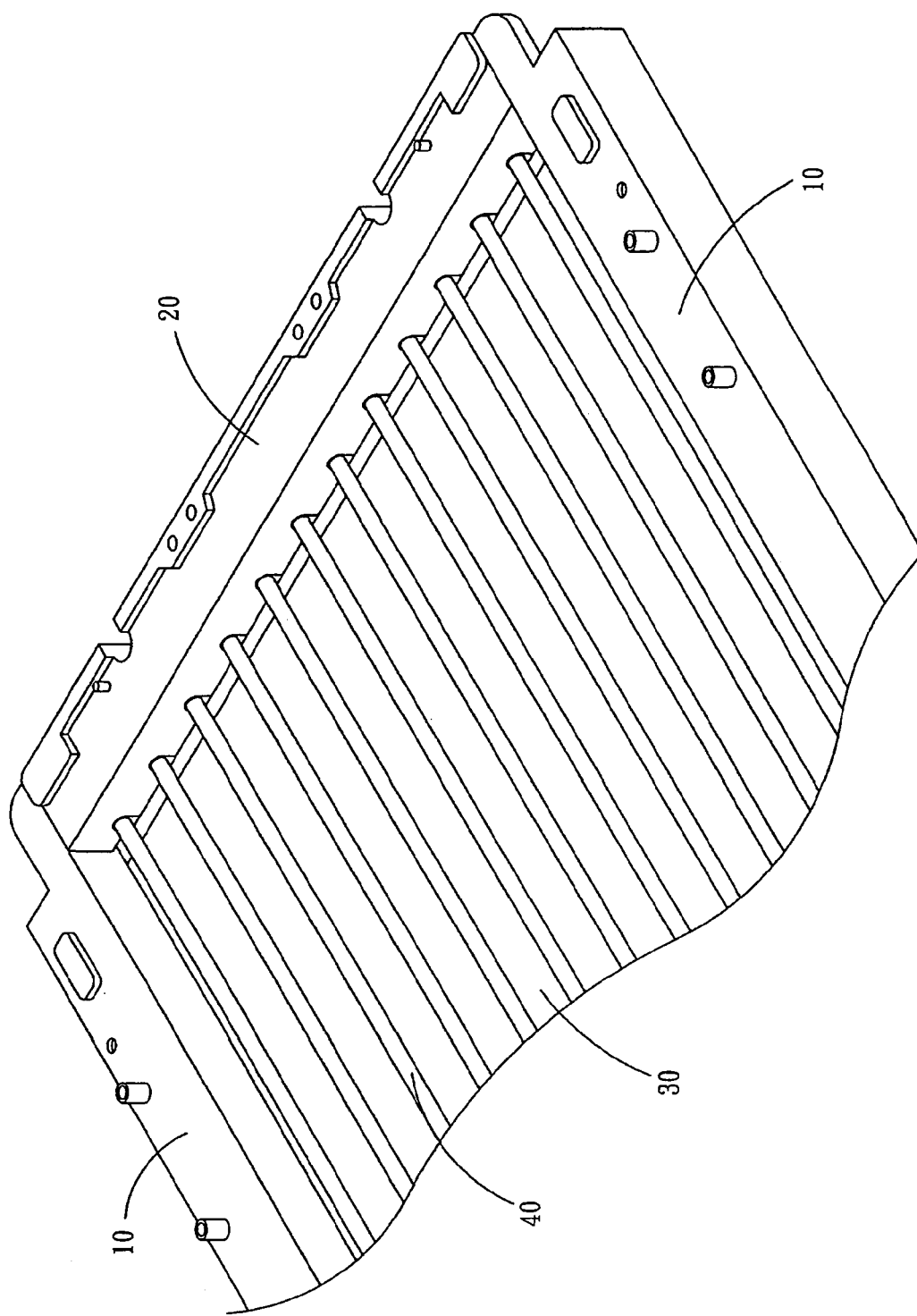
FIG. 1 is a schematic view of the major components of the conventional backlight module.
Figure 2:
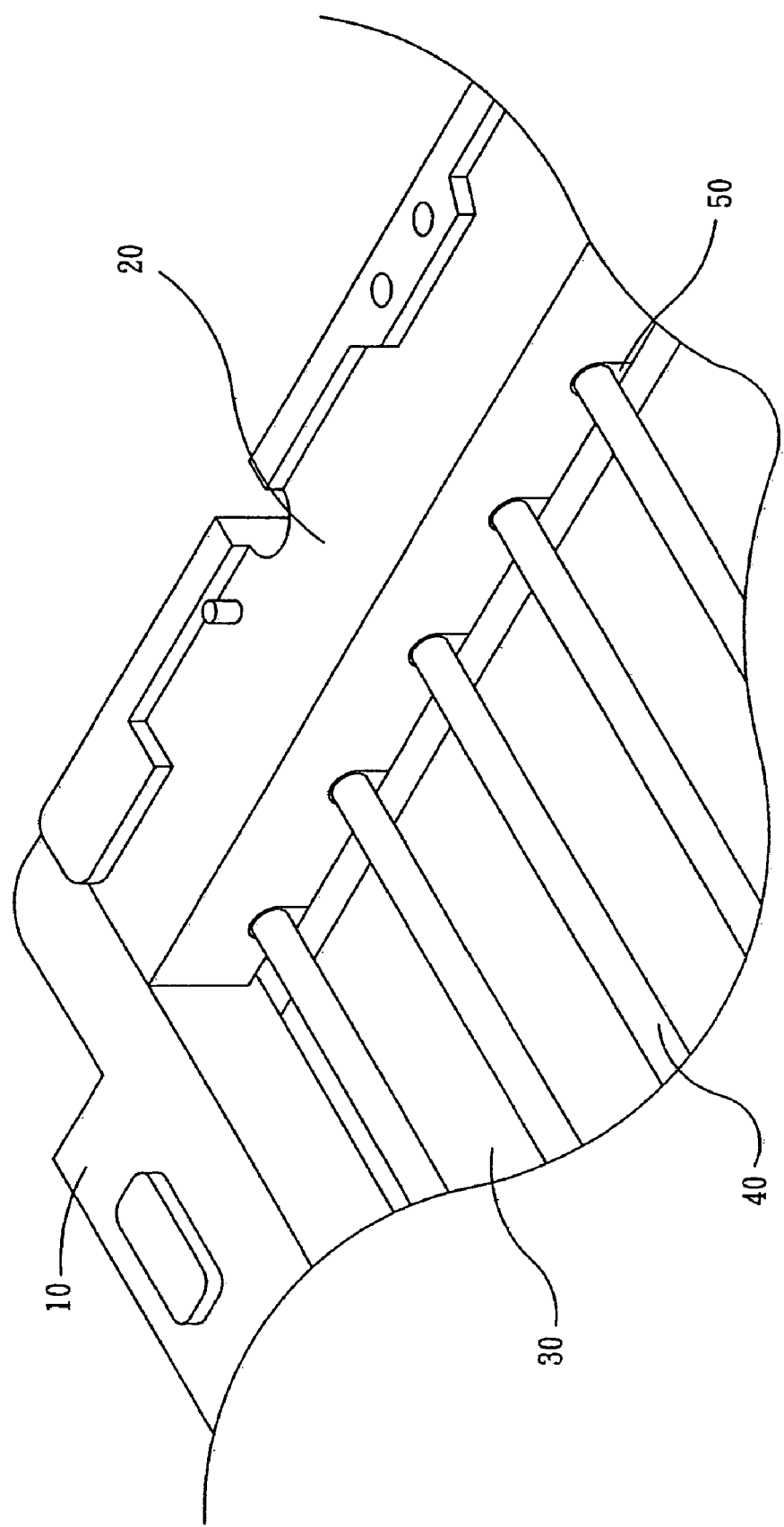
FIG. 2 is a partial, enlarged view of a segment of FIG. 1.
Figure 3:
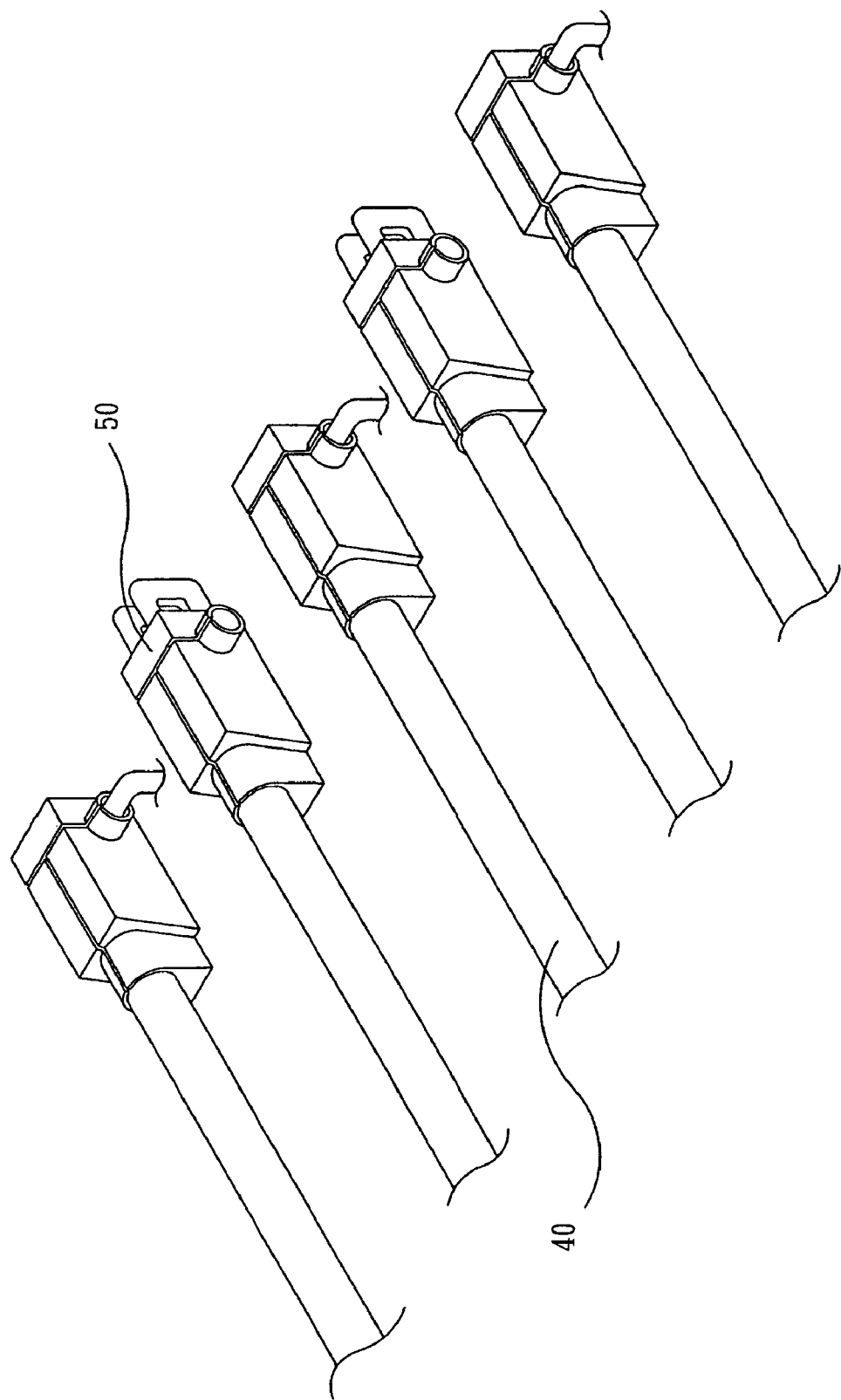
FIG. 3 is a schematic view of a conventional structure relating to lamps and fastening elements.
Figure 4:
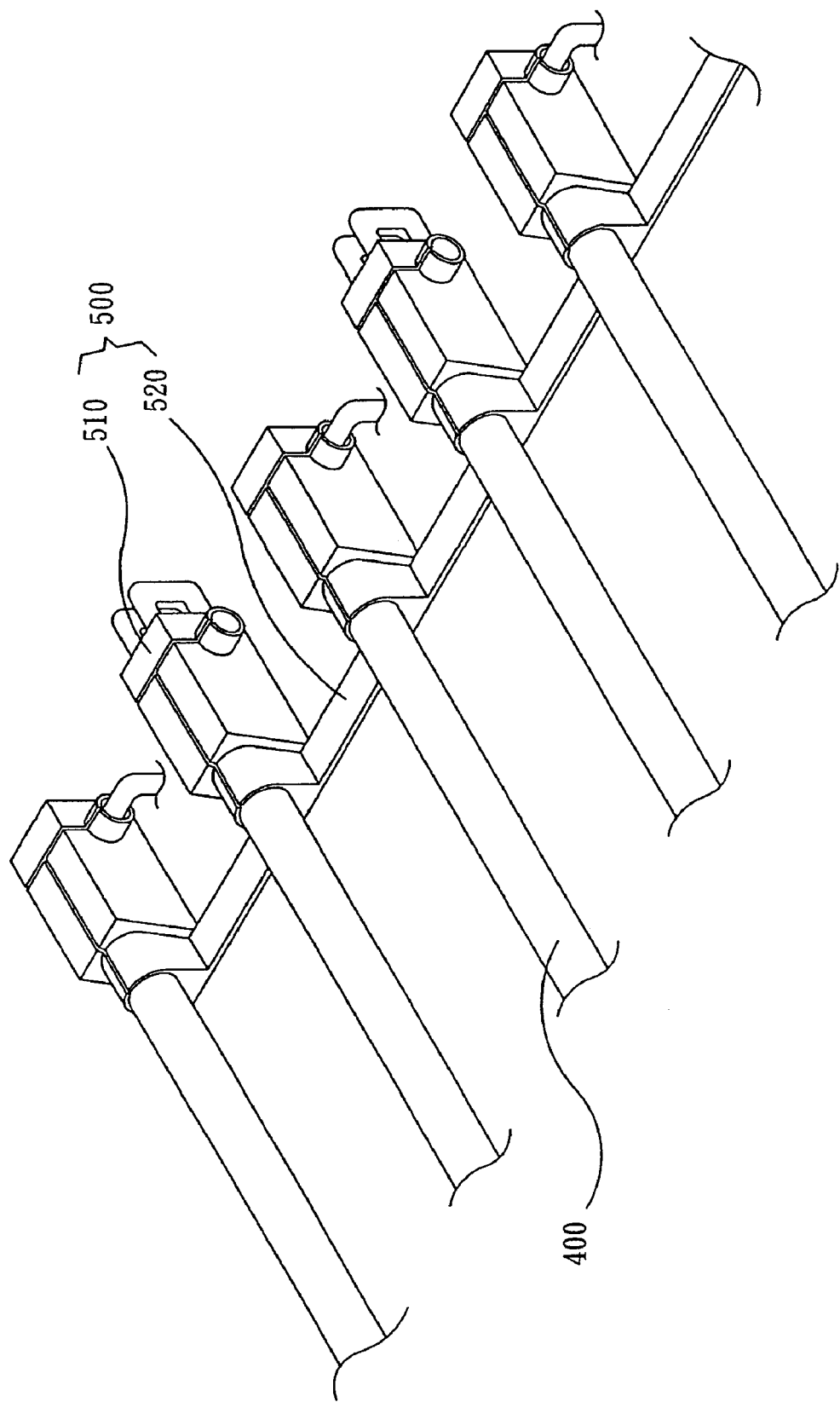
FIG. 4 is a schematic view of a noise reduction device arranged with lamps according to the present invention.

For the convenience of comprehension, the embodiment as shown in FIG. 4 is prepared under the construction as shown in FIG. 3 for better highlights of the features of the present invention. FIG. 4 illustrates a noise reduction device 500 for use in a backlight module and a lamp set that serves as the light source for the backlight module. Preferably, the lamp set includes a plurality of lamps 400 which are arranged in parallel. The noise reduction device 500 primarily comprises a plurality of main bodies 510 and a plurality of extension portions 520. Each of the main bodies 510 includes a recess for receiving and securing an end of each lamp 400 (not shown). Electrical circuits (not shown) disposed in each of the main bodies 510 are electrically connected to each of the lamps 400 for building up electrical connections between the lamps and the back light module and providing electrical power to operate the backlight module.

The structure of each extension portion 520 can be extended outward under the main body 510 along one or two opposing sides of the main body 510. Each extension portion 520 is adapted to selectively couple with its adjacent extension portion to form a partially or completely continuous construction. FIG. 4 shows a preferred embodiment of the extension portions 520. The extension portions 520 are located under the main bodies 510, whereby the extensions 520 are adapted to serially connect the main bodies 510 to form an integrally-formed noise reduction device 500. At least one of the main bodies 510 and extensions 520, or the noise reduction device 500 as a whole, is composed of, but not limited to, the materials selected from the group of rubber, silica gel, and the combination thereof It is understandable that any materials having cushioning effects can be applied to the present invention. Furthermore, if the noise reduction device 500 is modulated or formed into an integral structure, the predetermined intervals between each two adjacent main bodies 510 can be possible to control an equal pitch between the two lamps. This control not only allows for a uniform and concentrated light to flow from various light sources (i.e. the lamps), but also simplify the manufacture process and reduce cost of quality control of the backlight module.

More specifically, as compared with the related prior art, the present invention provides a cushion to isolate the lamp holders from the back bezel in the backlight module. In other words, the extension portion, which may serve as a partial or complete cushion effect, makes the lamp holder and the back bezel separated from each other, thus, reduces the pop or burst noise caused from temperature changes.

Figure 5:
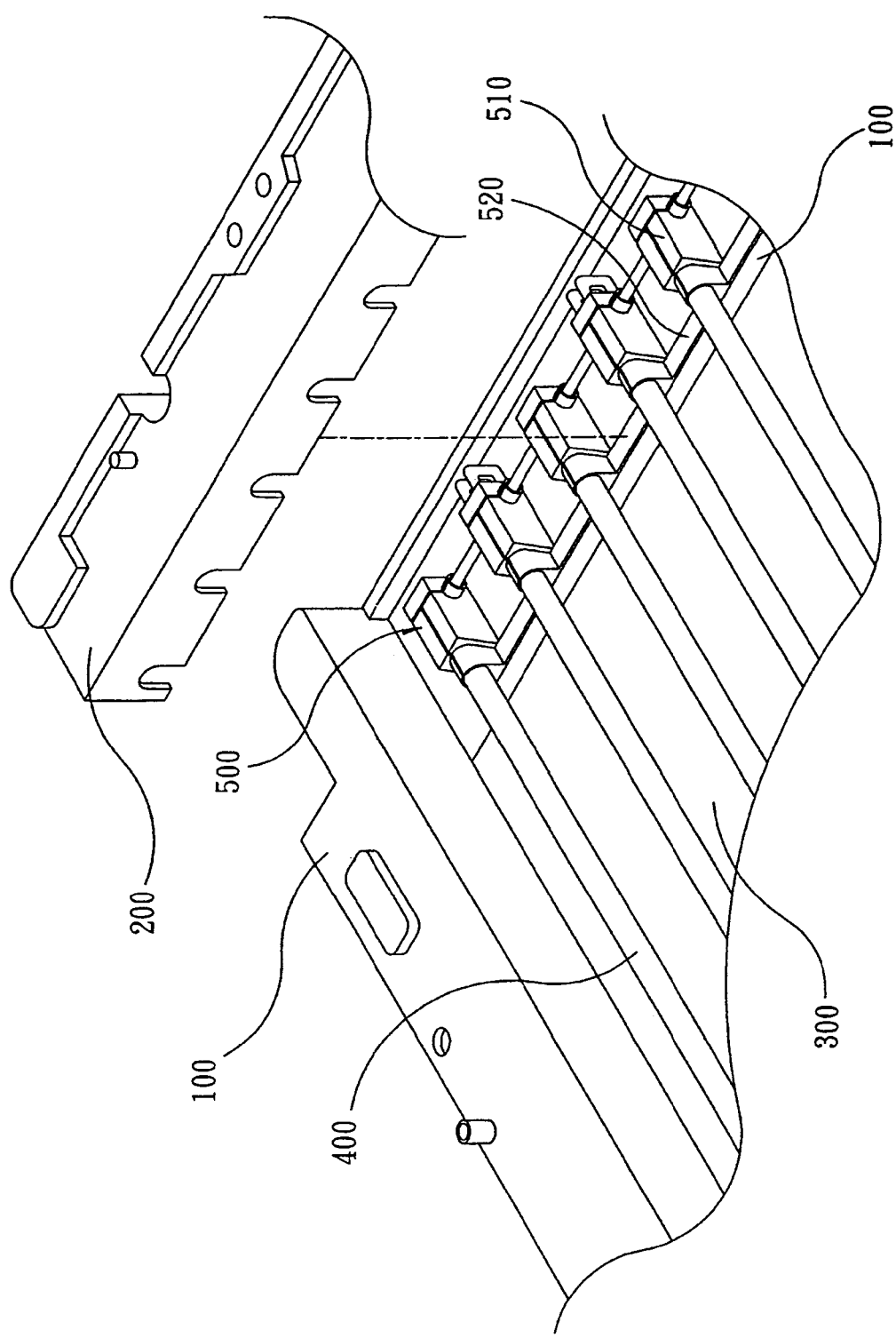
FIG. 5 is a schematic view of a noise reduction device for use with a backlight module according to the present invention.

With reference to FIG. 4 and FIG. 5, a back bezel 100, a lamp holder 200, a reflective sheet 300, a lamp set 400 and a noise reduction device 500 are disclosed as an embodiment. The difference between the present invention and the prior art resides in the fact that the present invention disposes the noise reduction device in the backlight module. The noise reduction device 500 is fixed onto two sides of the back bezel 100, engaging with the lamp holder 200. The other portions of the back bezel 100, lamp holder 200, reflective sheet 300 and lamp set 400 are similar to the conventional arrangement as shown in FIG. 3. Due to the noise reduction device 500 disposed between the back bezel 100 and lamp holder 200, the cushion effect of the extension portion 520 of the noise reduction device 500 is provided to absorb the deformation of the back bezel 100 and the lamp holder 200 when temperature changed, thereby eliminating the pop noise or burst noise.

A backlight module is a delicate display component and undesired dust leakage may be harmful to the normal operation. The noise reduction device of the present invention provides a cushion function not only reducing pop noise, but also blocking the possible passages for environmental dust.

It is further understandable that the noise reduction device can be any other design providing a cushion effect between the lamp holders and back bezel. For example, divide the integral noise reduction device into a plurality of independent units to perform similar functions.

Figure 6:
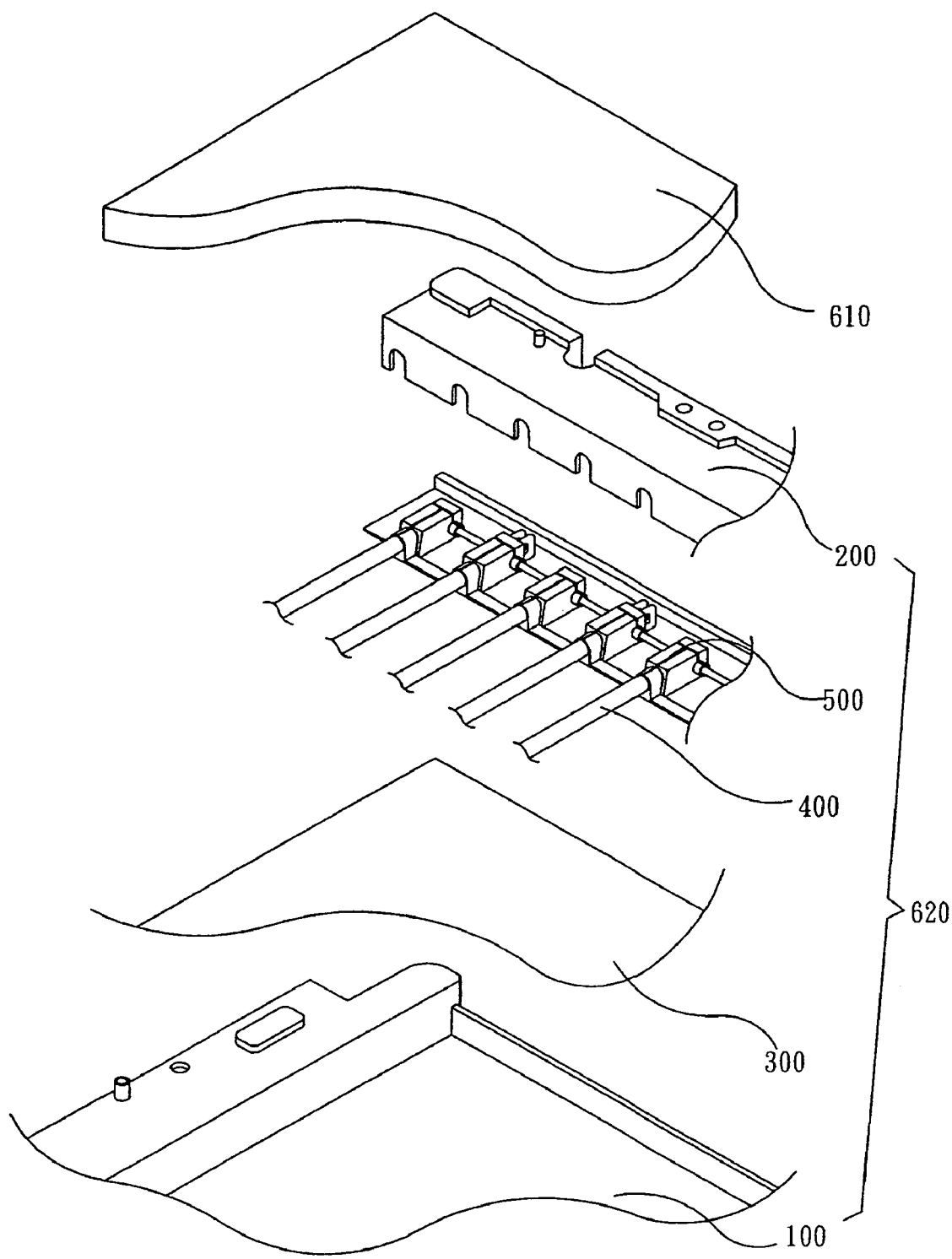
FIG. 6 is an exploded schematic view of a liquid crystal display which includes a noise reduction device according to the present invention.

FIG. 6 is an embodiment illustrating an LCD using the noise reduction device. In this embodiment, the noise reduction device also provides a noise elimination effect of the whole LCD when temperature changes arise. In this case, the LCD includes a liquid crystal panel 610 and a backlight module 620. The backlight module 620 is disposed under the liquid crystal panel 610. The backlight module 620 includes a back bezel 100, a lamp holder 200 and a noise reduction device 500. The noise reduction device 500 is disposed between the back bezel 100 and the lamp holder 200. The details of the noise reduction device 500 can be referred to the above-mentioned embodiments.

The arrangement of the noise reduction device of the present invention would not increase the complexity of the original components and manufacturing process. It is merely needed to modify the conventional fastening elements with a very limited change in the mold. This minor change greatly improves the control of the temperature-change noise, while keeping the cost relatively low.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. In a backlight module for a display device that includes a lamp holder and a back bezel having a top surface that is generally parallel to a display surface of the display device, a noise reduction device for disposition between the lamp holder and the back bezel, the noise reduction device comprising a plurality of noise reduction members each comprising:
   a main body, having at least one recess for holding at least one lamp, and having a bottom side situated at the top surface of the back bezel; and
   an extension portion, extending outward from the bottom side of the main body along the top surface of the back bezel, such that the extension portion is adapted to substantially isolate the lamp holder from the back bezel notwithstanding any occurrence of thermal expansion over changes in operational temperature of the backlight module.

2. The noise reduction device of claim 1, wherein the extension portion of each of the noise reduction members extends toward an outer side of the main body.

3. The noise reduction device of claim 1, wherein the extension portion of each of the noise reduction members extends toward two opposing outer sides of the main body.

4. The noise reduction device of claim 1, wherein the extension portion of each of the noise reduction members connects with the extension portion of its adjacent noise reduction member to form an integral extension portion, thereby constituting an integrally formed noise reduction device.

5. The noise reduction device of claim 1, wherein at least one of the main body and extension portion is composed of materials selected from the group consisting of: rubber, silica gel, or a combination thereof.

6. A noise reduction device for use in a backlight module for use in a display device, the noise reduction device disposed between a lamp holder and a back bezel of the backlight module, the back bezel having a top surface that is generally parallel to a display surface of the display device, the noise reduction device comprising:
   a plurality of sequentially arranged main bodies, each having at least one recess, for holding at least one lamp; and
   a plurality of extension portions disposed between the plurality of main bodies and the top surface of the back bezel, and serially connected to the plurality of main bodies.

7. The noise reduction device of claim 6, wherein the plurality of main bodies and the plurality of extension portions are formed integrally.

8. The noise reduction device of claim 6, wherein at least one of the main bodies and extension portions is composed of materials selected from the group consisting of: rubber, silica gel, or a combination thereof.

9. A backlight module for use in a display device, the backlight module comprising:
   a back bezel having a top surface that is generally parallel with a display surface of the display device;
   at least one lamp;
   a lamp holder; and
   a noise reduction device disposed between the back bezel and the lamp holder, the noise reduction device comprising:
      a plurality of sequentially arranged main bodies, each having at least one recess for holding the at least one lamp; and
      a plurality of extension portions disposed between the plurality of main bodies and the top surface of the back bezel, and serially connected to the plurality of main bodies.

10. The display of claim 9, wherein the plurality of main bodies and extension portions are formed integrally.

11. The display of claim 9, wherein at least one of the main bodies and extension portions is composed of materials selected from rubber, silica gel, the combinations thereof.

* * * * *